H. N. THROOP.
Governor.

No. 18,997.

Patented Dec. 29, 1857.

UNITED STATES PATENT OFFICE.

H. N. THROOP, OF PULTNEYVILLE, NEW YORK.

GOVERNOR FOR STEAM-ENGINES.

Specification of Letters Patent No. 18,997, dated December 29, 1857.

*To all whom it may concern:*

Be it known that I, H. N. THROOP, of Pultneyville, in the county of Wayne and State of New York, have invented a new and Improved Governor for Steam-Engines and other Motors; and I do hereby declare that the following is a full, clear, and exact description of the same, reference being had to the accompanying drawings, making part of this specification, in which—

Figure 1:
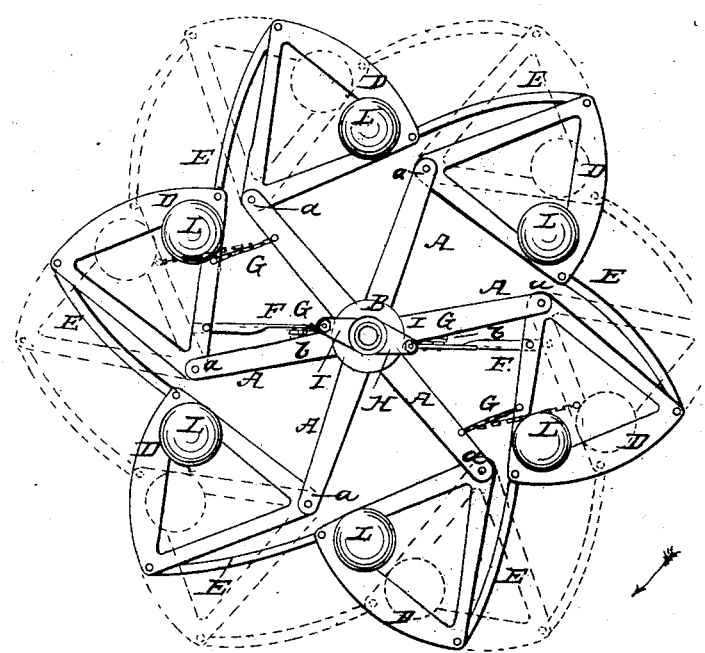
Figure 2:
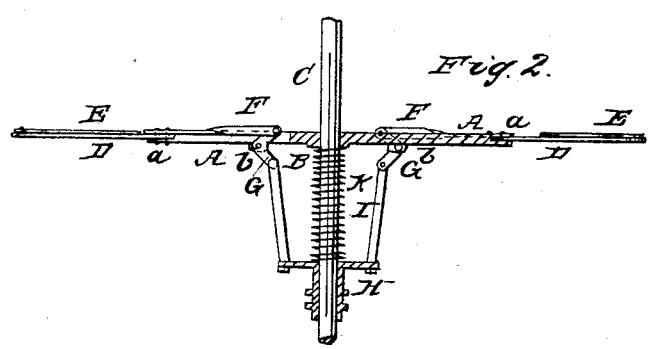

Figure 1 is a view of the governor, with the axis perpendicular to the plane of vision. Fig. 2, is a central section of the same.

Similar letters of reference indicate corresponding parts in both figures.

This invention consists in a wheel with a series of connected segments so applied as to be capable of moving from and toward its center, or, in other words, to form an expanding and contracting rim, and combined with a spring or springs acting in opposition to the centrifugal force generated in the said segments or expanding rim by the rotation of the wheel, so that the said segments or expanding rim will have a tendency to move from or toward the axis as the velocity of the wheel increases or diminishes with the increasing or diminishing velocity of the motor, and thus, through suitable mechanism, will act upon the regulator to diminish or increase the supply of steam or other motive agent. The advantage which this governor possesses over the common ball governor is that it will operate equally well with its axis in any position.

To enable others skilled in the art to make and use my invention, I will proceed to describe its construction and operation.

A, A, are a series of arms, rigidly attached to a hub B, fast upon a shaft C.

D, D, are the segments, which, with connecting links E, E, from one to another, form the expanding rim of the wheel; said segments being of similar triangular form, and corresponding in number with the arms A, A, to which they are severally pivoted at one of their angles by pivots *a, a,* and being connected together at their other angles by the links E, E, which are of equal length so that all the segments will have a corresponding movement toward or from the shaft C, upon the pivots *a, a.*

F, F, are two rods connecting the corresponding sides of two opposite segments with two elbow levers G, G, which are arranged upon fulcra *b, b,* attached to two of the arms A, A, near the hub, to move in planes parallel with the axis of the wheel, and are connected by other rods I, I, with a flanch on a sleeve H, that is fitted to slide upon the shaft C; and by that means any movement of the segments on the pivots *a, a,* will be accompanied by a movement of the sleeve H, along the shaft.

K, is a spiral spring coiled upon the shaft C, between the hub B, and the sleeve H, and tending by its resistance to compression between said hub and sleeve to oppose the movement of the segments D, D, in an outward direction or from the center of the wheel. The segments are provided each with a rigidly attached weight L, arranged at the junction of the side opposite the pivot *a,* with the side which is nearest the center of the wheel when the segments are moved toward the said center, which arrangement affords them a more nearly radial movement from the center of the wheel when the segments swing outward than any other position.

The governor is to be geared with the engine or other motor to receive a rotary motion therefrom (generally at a high velocity). An increased velocity generating a greater amount of centrifugal force in the segments causes them to fly outward, or, in other words, causes the rim of the wheel to expand till by the accompanying movement of the sleeve H, the tension of the spring is increased sufficiently to counterbalance the said force; and a diminished velocity generating less centrifugal force allows the tension of the spring to act upon the sleeve and draw in the balls or weights L, till the said tension is reduced sufficiently to balance the centrifugal force. The sleeve being connected with the regulator in a proper manner, the supply of steam or motive agent is regulated to regulate the velocity. The governor may be regulated for different velocities by increasing or diminishing the tension of the spring K, accordingly. In Fig. 1, auxiliary springs *s, s,* (which may be of india-rubber or metal,) are represented applied between two of the segments and the arms A, A, to draw the segments inward. These may be used or not, in connection with the spring K, or they may even be substituted for said spring. The governor is shown in two conditions in Fig. 1, one in black outline and the other in red outline, which serves to illustrate the movements of its parts. When it is at rest, the segments rest each upon its next neighbor or upon the arm A, next to that to which it is attached. The parts should be so proportioned that by the outward movement of the segments they may be capable of doubling their distance from the axis of the wheel, or in other words that the rim of the wheel may be expanded to double its diameter.

The governor will operate in a horizontal or any other position; as the effect of gravitation on the several weights to change their positions relatively to the axis of the wheel will be counteracted by an opposite effect on others. It will rotate in either direction with nearly equal results; but when the power or resistance is very variable, it will be found more sensitive when rotating so that the weights will fall back from radial lines as they move outward, i. e. in the direction indicated by an arrow in Fig. 1.

In addition to the advantage this governor possesses of being operative with its axis in any position, it is extremely sensitive, and occupies very little room in the direction of its axis. It is also of very cheap construction; almost the whole of it can be cast from two or three patterns, and very little fitting up is required.

The wheel with its segments and springs, but without a connection with the motor by rods and sleeve, may be used as an expanding and contracting balance.

In the withdrawn application of J. J. Sherman, April, 1849, the governor balls are made to travel in and out upon radial lines from a common center. I disclaim this device. It will be observed that in my governor, the weights do not move out from and into the axle in a radial line; but in moving out, they fall back of such line to any desired extent, depending upon the arrangement of the spring or springs and the length of the connections, or in other words, depending on the limits prescribed for the weights to move in, toward and from the axle. If the paddle-wheel or screw to which an engine is attached is, by the uneven surface of the water and the plunging of the vessel, suddenly and frequently thrown out of the water, as is often the case, leaving no resistance to the power and motion of the engine, except the inertia of the wheels or screw, the motion of the engine and the spindle of the governor is instantly increased; but the weights of the governor, on account of their inertia, will not readily participate in such increased motion, consequently they are left behind or fall back of the radial line, with a movement outward, aided in some degree by the centrifugal force due to the increased motion of the engine; thus instantly closing the valve.

When the engine is moving at a desired speed, or has acquired more than a desired speed, the weights of the governor, having gradually acquired a motion due to such speed, the paddles of the wheels or the screw may be suddenly submerged, instantly checking the motion of the engine; but the weights by the momentum due to their velocity, have a tendency to continue moving forward in their circular course; and the centrifugal force of the weights being counteracted by the spring, they move instantly forward in relation to the spindle, and inward; thereby instantly opening the throttle valve to any desired extent.

What I claim as my invention, and desire to secure by Letters Patent, is:

The combination of the arms A, or their equivalents, the expanding segments and links constituting the expanding rim, and the springs to operate substantially as herein described.

H. N. THROOP.

Witnesses:
J. ADAMS SMITH,
WM. H. SHUMWAY.